(12) United States Patent
Phan et al.

(10) Patent No.: US 8,897,716 B2
(45) Date of Patent: Nov. 25, 2014

(54) MEASURING QUALITY OF EXPERIENCE ASSOCIATED WITH A MOBILE DEVICE

(71) Applicant: Empire Technology Development LLC, Wilmington, DE (US)

(72) Inventors: Wei Yeu Phan, Singapore (SG); Tralvex Yeap, Singapore (SG)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 14/154,850

(22) Filed: Jan. 14, 2014

(65) Prior Publication Data

US 2014/0129289 A1 May 8, 2014

Related U.S. Application Data

(63) Continuation of application No. 13/579,248, filed as application No. PCT/US2012/028332 on Mar. 8, 2012, now Pat. No. 8,670,723.

(51) Int. Cl.

| H04B 17/00 | (2006.01) |
|---|---|
| G06Q 30/02 | (2012.01) |
| G06K 9/03 | (2006.01) |
| H04W 24/00 | (2009.01) |
| G06K 9/20 | (2006.01) |
| G06K 9/00 | (2006.01) |
| H04W 24/10 | (2009.01) |

(52) U.S. Cl.
CPC ............ *G06Q 30/0201* (2013.01); *G06K 9/036* (2013.01); *H04W 24/00* (2013.01); *H04W 24/10* (2013.01); *G06K 9/2027* (2013.01); *G06K 9/00302* (2013.01)

USPC .......................................... 455/67.11

(58) Field of Classification Search
USPC .............................................. 455/67.11, 423
See application file for complete search history.

(56) References Cited

U.S. PATENT DOCUMENTS

| 6,600,830 | B1 | 7/2003 | Lin et al. | |
|---|---|---|---|---|
| 6,895,256 | B2 | 5/2005 | Harma et al. | |
| 7,236,615 | B2 * | 6/2007 | Miller et al. | 382/118 |
| 7,239,726 | B2 | 7/2007 | Li | |
| 7,460,693 | B2 | 12/2008 | Loy | |
| 7,633,076 | B2 | 12/2009 | Huppi | |
| 7,657,086 | B2 * | 2/2010 | Gu | 382/159 |
| 7,738,997 | B2 * | 6/2010 | Lin | 700/245 |
| 7,848,548 | B1 * | 12/2010 | Moon et al. | 382/118 |
| 7,904,204 | B2 * | 3/2011 | Lin | 700/245 |
| 7,929,771 | B2 * | 4/2011 | Ko et al. | 382/190 |
| 8,050,465 | B2 * | 11/2011 | Ianculescu et al. | 382/118 |
| 8,254,647 | B1 * | 8/2012 | Nechyba et al. | 382/118 |
| 8,346,217 | B2 * | 1/2013 | Crawford et al. | 455/411 |
| 8,385,221 | B2 * | 2/2013 | Chetlur et al. | 370/252 |
| 2006/0281497 | A1 | 12/2006 | Lai | |

(Continued)

OTHER PUBLICATIONS

IDA Singapore, Quality of Service, Singapore Government, Sep. 3, 2010, http://www.ida.gov.sg/Policies%20and%20Regulation/20060424141236.aspx, Singapore.

(Continued)

*Primary Examiner* — April G Gonzales
(74) *Attorney, Agent, or Firm* — Brundidge & Stanger, P.C.

(57) ABSTRACT

Implementations and techniques for measuring quality of experience associated with a mobile device are generally disclosed.

12 Claims, 7 Drawing Sheets

(56) References Cited

U.S. PATENT DOCUMENTS

| | | | |
|---|---|---|---|
| 2007/0142965 A1* | 6/2007 | Lin | 700/245 |
| 2008/0109397 A1* | 5/2008 | Sharma et al. | 707/1 |
| 2009/0313584 A1 | 12/2009 | Kerr | |
| 2010/0128291 A1* | 5/2010 | Vendrow et al. | 358/1.9 |
| 2010/0161122 A1* | 6/2010 | Lin | 700/245 |
| 2011/0074931 A1 | 3/2011 | Bilbrey | |
| 2011/0125561 A1* | 5/2011 | Marcus | 705/14.15 |
| 2011/0128384 A1 | 6/2011 | Tiscareno et al. | |
| 2011/0211464 A1* | 9/2011 | Chetlur et al. | 370/252 |
| 2011/0317872 A1* | 12/2011 | Free | 382/103 |
| 2012/0118947 A1* | 5/2012 | Lyons et al. | 235/375 |
| 2012/0214442 A1* | 8/2012 | Crawford et al. | 455/411 |
| 2012/0232966 A1* | 9/2012 | Calman et al. | 705/14.1 |
| 2013/0004016 A1* | 1/2013 | Karakotsios et al. | 382/103 |

OTHER PUBLICATIONS

IDA Singapore, IDA's new regulations for mobile and broadcast services empower consumers to make informed choices, Singapore Government, Mar. 14, 2011, http://www.ida.gov.sg/News%20and%20Events/20110314122636.aspx?getPagetype=20, Singapore.

M2CMOBILE, Apple files patent for 3D phone, M2Cmobile, Apr. 1, 2011, http://m2cmobile.blogspot.com/2011/04/apple-files-patent-for-3d-iphone.html.

Pantic, M. et al., Toward an affect-sensitive multimodal human-computer interaction, Proceedings of the IEEE, vol. 9, No. 91, 1370-1390, Sep. 2003.

Bartlett, M.S. et al., Measuring facial expressions by computer image analysis, Psychophysiology, 36, pp. 253-263, 1999.

Ekman, Paul, Chapter 3: Basic emotions, Handbook of Cognition and Emotion, T. Dalgleish and M. Power {Eds.), 1999, John Wiley & Sons, Ltd., Sussex, UK.

Ekman, Paul, Cutting Edge Behavioral Science for Real World Applications, Dr. Paul Ekman Website, http://www.paulekman.com/, 2011, Paul Ekman Group LLC.

Roesner, Infrared Sensitivity Comparisons, artechnic, 2004, http://www.jr-worldwi.de/photo/index.html?ir_comparisons.html.

Bombaykaizoku, iPhone 3GS + Hoya R72 filter= near infrared camera, YouTube, Jul. 2, 2009, http://www.youtube.com/watch?v=JjwteEDPqg.

Interealtime.com, True nightvision, iTunes App Store, Jan. 24, 2012, http://itunes.apple.com/us/app/true-nightvision/id407897439?mt=8.

Taimori, A. et al., Automatic human face detection and tracking using cascaded classifiers and deformable meshes, Modares Journal of Electrical Engineering, 2010, 10(1), pp. 126-109.

Australian Patent Office, International Search Report and Written Opinion of the International Searching Authority for PCT/US2012/028332, mailed on May 23, 2012, Australia.

Jumisko-Pykko, S. et al., Results of the user-centred quality evaluation experiments, Technical report D4.4, MOBILE3DTV, Nov. 2009, Project No. 216503, pp. 1-45.

* cited by examiner

600 A computer program product.

602 A signal bearing medium.

604 Machine-readable instructions, which, if executed by one or more processors, operatively enable a computing device to:
    receive one or more criterion data from at least one mobile device;
    screen for one or more acceptable mobile devices based at least in part on the one or more criterion data;
    send a request for a quality of experience measurement to the one or more acceptable mobile devices, wherein the request for a quality of experience measurement is associated with one or more activation codes capable of activating the quality of measurement at the one or more acceptable mobile devices; and/or
    receive one or more measured quality of experience data sets from at least a portion of the one or more acceptable mobile devices.

| 606 a computer-readable medium. | 608 a recordable medium. | 610 a communications medium. |

FIG. 6

MEASURING QUALITY OF EXPERIENCE ASSOCIATED WITH A MOBILE DEVICE

BACKGROUND

Unless otherwise indicated herein, the approaches described in this section are not prior art to the claims in this application and are not admitted to be prior art by inclusion in this section.

Low Quality of Service (QoS) may be associated with a corresponding low Quality of Experience (QoE). Measurement of QoE may alert a service provider on potential occurrences of low QoS.

For example, such measurement of QoE may assist a service provider in allocating resources, as resources are scarce and it is difficult to cater for all needs. Measurement of QoE may assist in resource allocation where a service provider is to choose which services or applications to downgrade in cases where bandwidth is near to a threshold.

However, measurement of QoE may be complicated. For example, measurement of QoE may be complicated if different customers have different tolerances towards similar drops in QoS and/or may have different tolerances depending on the type of services being utilized.

SUMMARY

Some example methods, apparatus, and systems related to measured quality of experience may be implemented in a communication network associated with a plurality of mobile devices. Such methods may include receiving one or more criterion data from at least one mobile device. One or more acceptable mobile devices may be screened based at least in part on the one or more criterion data. A request for a quality of experience measurement may be sent to the one or more acceptable mobile devices, where the request for a quality of experience measurement may be associated with one or more activation codes capable of activating the quality of experience measurement at the one or more acceptable mobile devices. One or more measured quality of experience data sets may be received from at least a portion of the one or more acceptable mobile devices.

Some example methods, apparatus, and systems related to measured quality of experience may be implemented in a communication network associated with a plurality of mobile devices. Such methods may include receiving one or more criterion data from at least one mobile device. One or more acceptable mobile devices may be screened based at least in part on the one or more criterion data. A request for a quality of experience measurement may be sent to the one or more acceptable mobile devices. One or more measured quality of experience data sets may be received from at least a portion of the one or more acceptable mobile devices. Demographic information associated with individual users of the one or more acceptable mobile devices may be received, where the demographic information may include one or more of the following data: age data, gender data, and/or ethnicity data. A facial emotional interpretation of the one or more measured quality of experience data sets may be performed based at least in part on the demographic information.

Some example methods, apparatus, and systems related to measured quality of experience may be implemented in mobile device associated with a communication network. Such methods may include receiving, via a mobile device, a request for a quality of experience measurement from a mobile service provider. Ambient light levels may be sensed via one or more optical sensors associated with the mobile device. Brightness may be adjusted based at least in part on the sensed ambient light levels. A user's face may be detected via the one or more optical sensors associated with the mobile device. The user's facial features may be detected via the one or more optical sensors associated with the mobile device. A determination may be made of whether the adjusting of brightness, the detection of the user's face, and/or the detection of the user's facial features is successful. The quality of experience measurement may be started based at least in part on the determination that the adjusting of brightness, the detection of the user's face, detecting a user's facial expression, detecting a user's pupil size, detecting a user's facial temperature, and/or the detection of the user's facial features is successful.

Some example apparatus and systems related to measuring quality of experience may be implemented in a mobile device configured to facilitate communication in a communication network. Such a mobile device may include a processor, one or more optical sensors, an RF transceiver, and an antenna. The one or more optical sensors may be coupled to the processor. The RF transceiver may be operably coupled to the processor. The antenna may be operably coupled to the RF transceiver. The processor, in conjunction with the one or more optical sensors, the RF transceiver, and the antenna, may be configured to receive, via the RF transceiver and the antenna, a request for a quality of experience measurement from a mobile service provider. Ambient light levels may be sensed via the one or more optical sensors. An adjustment to brightness may be based at least in part on the sensed ambient light levels. A user's face may be detected via the one or more optical sensors associated with the mobile device. The user's facial features may be detected via the one or more optical sensors associated with the mobile device. A determination may be made whether the adjusting of brightness, the detection of the user's face, and/or the detection of the user's facial features is successful. The quality of experience measurement may be started based at least in part on the determination that the adjusting of brightness, the detection of the user's face, and/or the detection of the user's facial features is successful.

Some example articles may include machine-readable instructions for measuring quality of experience. Such machine-readable instructions may include receiving one or more criterion data from at least one mobile device. One or more acceptable mobile devices may be screened based at least in part on the one or more criterion data. A request for a quality of experience measurement may be sent to the one or more acceptable mobile devices, where the request for a quality of experience measurement may be associated with one or more activation codes capable of activating the quality of experience measurement at the one or more acceptable mobile devices. One or more measured quality of experience data sets may be received from at least a portion of the one or more acceptable mobile devices.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 6 is an illustration of an example computer program product that is arranged in accordance with at least some embodiments of the present disclosure.

DETAILED DESCRIPTION

Figure 1:
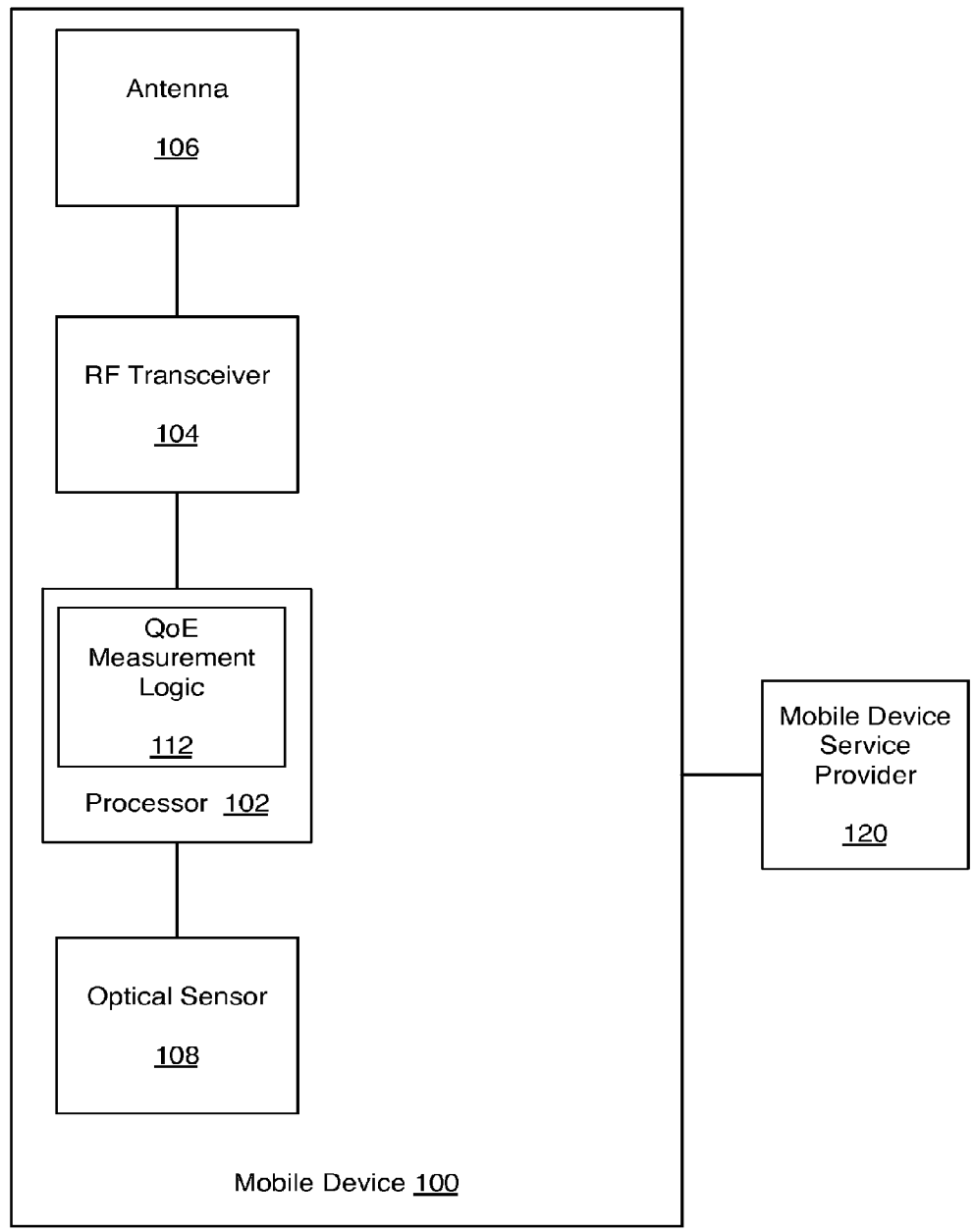
FIG. 1 is a schematic diagram of an example mobile device that is arranged in accordance with at least some embodiments of the present disclosure.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, and systems related to measuring quality of experience associated with a mobile device.

FIG. 1 is a schematic diagram of an example mobile device that is arranged in accordance with at least some embodiments of the present disclosure. In the illustrated example, a mobile device 100 may be configured to facilitate communication in a communication network (not shown). As used herein the term "communication network" may refer to any number of communication systems including a plurality of mobile devices adapted for wireless communication with one another via the communication network. For example, "communication network" may refer to any number of mobile service providers 120 including one or more of the following: a cellular phone network, a mobile worldwide interoperability for microwave access network (WiMax), voice over Internet protocol (VoIP) system (e.g., via a wireless local area network (WLAN), a wireless wide area network (WWAN)), Long Term Evolution network (LTE), Orthogonal Frequency-Division Multiple Access network (OFDMA), the like, and/or combinations thereof, according to the particular application. Additionally or alternatively, such a communication network may refer to any number of communication systems that provide Internet access to a plurality of mobile devices.

Mobile service provider 120 is presented herein purely for illustrative purposes and it may be recognized that mobile service provider 120 may have additional components that have not been depicted in FIG. 1 in the interest of clarity. Accordingly, mobile service provider 120 may include any number of components that are not illustrated here, such as one or more base stations, base station controllers, mobile switching center, the like, and/or combinations thereof. As used herein the term "base station" may refer to a portion of mobile service provider 120 that is configured to facilitate communication among a plurality of mobile devices.

In some examples mobile device 100 may include a processor 102, an RF transceiver 104, an antenna 106, and/or one or more optical sensors 108. Further, mobile device 100 may also include additional items such as a speaker, a display, an accelerometer, a memory, a router, network interface logic, etc. that have not been shown in FIG. 1 for the sake of clarity.

Processor 102 may be located within a housing (not shown) of mobile device 100. For example, processor 102 may be a microprocessor or Central Processing Unit (CPU). In other implementations, processor 102 may be an Application Specific Integrated Circuit (ASIC), a Field Programmable Gate Array (FPGA), a digital signal processor (DSP), or other integrated formats.

RF transceiver 104 may be operably coupled to processor 102. RF transceiver 104 may, in some implementations, be a radio frequency-type (RF) transceiver. Also, while RF transceiver 104 is one example of transceiver, claimed subject matter is not limited in this regard and mobile device 100 may, for example, employ a distinct RF receiver and RF transmitter circuitry.

Antenna 106 may be operably coupled to RF transceiver 104. Antenna 106 may be any suitable antenna, including but not limited to loop, dish, parabolic, panel, sector, directional, omnidirectional, etc.

Optical sensor(s) 108 may be operably coupled to processor 102. Optical sensor(s) 108 may be configured to receive optical data. For example, optical sensor(s) 108 may be configured to receive light in the visible spectrum, infrared light, the like, and/or combinations thereof. Such received light may be utilized for sensing ambient light levels, detecting a user's face, detecting a user's facial features, the like, and/or combinations thereof.

As will be discussed in greater detail below, mobile device 100 may be used to perform some or all of the various functions discussed below in connection with FIGS. 2-5. For example, mobile device 100 may also include QoE measurement logic 112 that may be configured to undertake any of the operations of FIGS. 2-5, as will be discussed in further detail below. QoE measurement logic 112 may provide any of the functionality described herein and claimed subject matter is not limited to specific types or manifestations of processing logic.

For example, mobile device 100 may be configured to receive a request for a quality of experience measurement from a mobile service provider 120. Ambient light levels may be sensed via optical sensor(s) 108. An adjustment to brightness may be based at least in part on the sensed ambient light levels. A user's face may be detected via optical sensor(s) 108. The user's facial features may be detected via optical sensor(s) 108. A determination may be made whether the adjusting of brightness, the detection of the user's face, and/or the detection of the user's facial features is successful. The quality of experience measurement may be started based at least in part on the determination that the adjusting of brightness, the detection of the user's face, and/or the detection of the user's facial features is successful.

In some examples, mobile device 100 may be further configured to adjust a magnification level associated with optical sensor(s) 108 based at least in part on the detection of the user's face prior to the detection of the user's facial features.

In some examples, mobile device 100 may be further configured to repeat the adjusting of brightness, the detection of the user's face, and/or the detection of the user's facial features based at least in part on a determination that the adjusting of brightness, the detection of the user's face, and/or the detection of the user's facial features is unsuccessful, wherein the repeating is associated with one or more threshold values.

In some examples, mobile device 100 may be further configured to determine if any of the one or more threshold values have been exceeded.

In some examples, mobile device 100 may be further configured to send, via RF transceiver 104 and antenna 106, a failure to measure quality of experience message to mobile service provider 120 based at least in part a determination that the one or more threshold values have been exceeded.

In some examples, mobile device 100 may be further configured to send, via RF transceiver 104 and antenna 106, result data associated with the quality of experience measurement to mobile service provider 120, where result data may include pupil size data and/or facial temperature data as previously described.

In some examples, mobile device 100 may be further configured to automatically delete the result data from mobile device 100 after sending the result data to mobile service provider 120.

In some examples, mobile device 100 may be further configured to dynamically adjust brightness based at least in part on the sensed ambient light levels during the quality of experience measurement.

In some examples, mobile device 100 may be further configured to dynamically adjust a magnification level associated with the one or more optical sensors based at least in part on the detection of the user's face during the quality of experience measurement.

Figure 2:
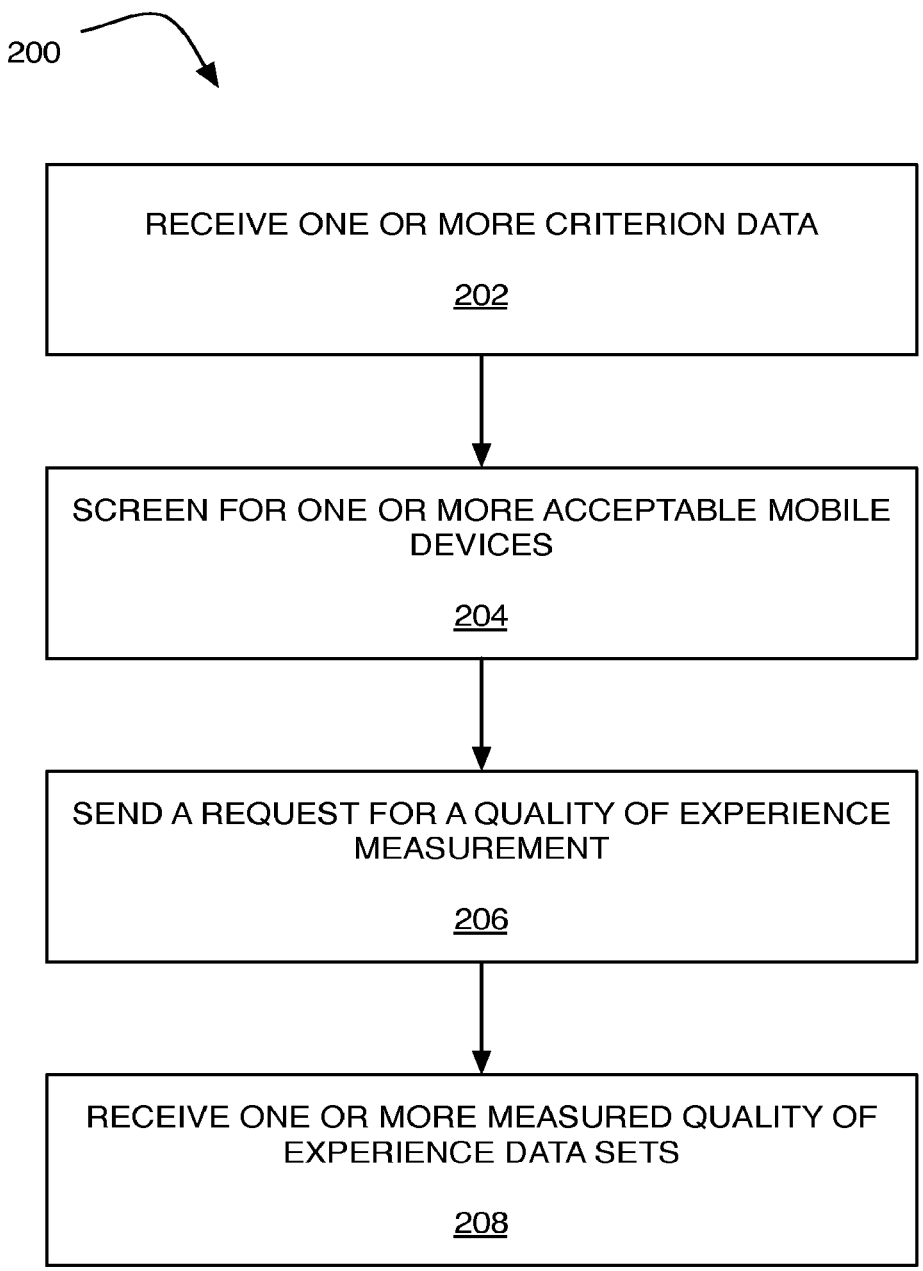
FIG. 2 illustrates an example process for measuring quality of experience that is arranged in accordance with at least some embodiments of the present disclosure.

FIG. 2 illustrates an example process for measuring quality of experience that is arranged in accordance with at least some embodiments of the present disclosure. Process 200, and other processes described herein, set forth various functional blocks or actions that may be described as processing steps, functional operations, events and/or acts, etc., which may be performed by hardware, software, and/or firmware. Those skilled in the art in light of the present disclosure will recognize that numerous alternatives to the functional blocks shown in FIG. 2 may be practiced in various implementations. For example, although process 200, as shown in FIG. 2, may comprise one particular order of blocks or actions, the order in which these blocks or actions are presented does not necessarily limit claimed subject matter to any particular order. Likewise, intervening actions not shown in FIG. 2 and/or additional actions not shown in FIG. 2 may be employed and/or some of the actions shown in FIG. 2 may be eliminated, without departing from the scope of claimed subject matter. Process 200 may include one or more of functional operations as indicated by example operations 202, 204, 206, and/or 208.

As illustrated, process 200 may be implemented for measuring quality of experience. Processing may begin at operation 202, "RECEIVE ONE OR MORE CRITERION DATA", where one or more criterion data may be received. For example, one or more criterion data may be received by a mobile service provider from at least one mobile device. As used herein the term "criterion data" may refer to one or more of the following: date data, time of day data, location data, a user opt-in assent, an application in use is suitable for facial detection via one or more optical sensors associated with the at least one mobile device, the like, and/or combinations thereof. The received one or more criterion data may be stored at the mobile service provider to facilitate subsequent use (e.g., would not need to receive data regarding user opt-in assent a second time).

Processing may continue from operation 202 to operation 204, "SCREEN FOR ONE OR MORE ACCEPTABLE MOBILE DEVICES", where for one or more acceptable mobile devices may be screened. For example, screening for one or more acceptable mobile devices may be based at least in part on the one or more criterion data.

Processing may continue from operation 204 to operation 206, "SEND A REQUEST FOR A QUALITY OF EXPERIENCE MEASUREMENT", where a request for a quality of experience measurement may be sent. For example, a request for a quality of experience measurement may be sent to the one or more acceptable mobile devices. In some examples, the request for a quality of experience measurement may be associated with one or more activation codes capable of activating the quality of experience measurement at the one or more acceptable mobile devices. Such a request for a quality of experience measurement may be based at least in part on a determination that the at least one mobile device matches a requested query. In some examples, the sending of the request for a quality of experience measurement may further be based at least in part on a determination that a number of collected samples are less than a number of requested samples.

Processing may continue from operation 206 to operation 208, "RECEIVE ONE OR MORE MEASURED QUALITY OF EXPERIENCE DATA SETS", where one or more measured quality of experience data sets may be received. For example, one or more measured quality of experience data sets may be received from at least a portion of the one or more acceptable mobile devices. In some examples, the measured quality of experience data sets may include pupil size data, facial temperature data, the like, and/or combinations thereof. One or more of these data sets may be utilized to determine various facial emotional interpretation such as, but not limited to, frustration, sadness, happiness, anger, etc.

Additionally or alternatively, demographic information associated with individual users of the one or more acceptable mobile devices may be received by a mobile service provider. Such demographic information may include one or more of the following data: age data, gender data, ethnicity data, the like, and/or combinations thereof. In such an example, the various facial emotional interpretation of the one or more measured quality of experience data sets may be based at least in part on the demographic information.

Some additional and/or alternative details related to process 200 may be illustrated in one or more examples of implementations discussed in greater detail below with regard to FIG. 5.

Figure 5:
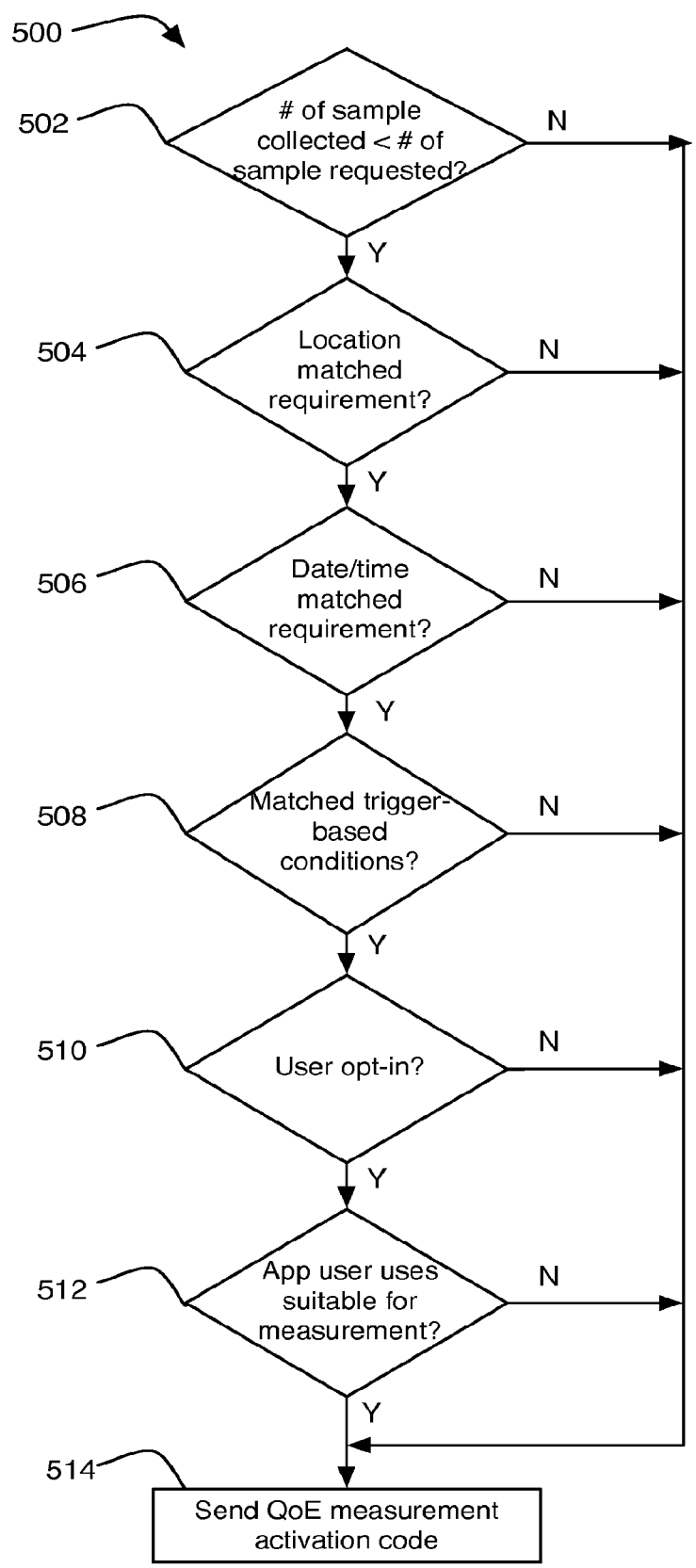
FIG. 5 illustrates an example process for screening mobile devices that is arranged in accordance with at least some embodiments of the present disclosure.

FIG. 5 illustrates an example process for screening mobile devices that is arranged in accordance with at least some embodiments of the present disclosure. As discussed above, with respect to process 200, one or more acceptable mobile devices may be screened. For example, screening for one or more acceptable mobile devices may be based at least in part on the one or more criterion data.

As illustrated, process 500 may be implemented for screening mobile devices. As illustrated, process 500 may include any number of decisions 502, 504, 506, 508, 510, 512, the like, and/or combinations thereof for screening mobile devices. For example, screening for one or more acceptable mobile devices may be based at least in part on one or more criterion data. Such criterion data may be received by a mobile service provider from at least one mobile device, and include one or more of the following: date data, time of day data, location data, a user opt-in assent, an application in use is suitable for facial detection via one or more optical sensors associated with the at least one mobile device, the like, and/or combinations thereof.

As illustrated, decision 504, "Location matched requirement", may relate to screening decisions based on location data (e.g., GPS data). For example, such a location matched requirement may be selected so as to target on locations with overcrowded users, low density of telecommunication towers, and/or intersections of communication cells (e.g., two or three cell hexagons) that might need more switching to different towers. In some examples, such a location matched requirement may be implemented by having graphical query entry methods, such as "circling areas of interests", "selecting specific entities", "selecting a preset group", the like, and/or combinations thereof. For example, an example query might select random users in a given cell of a communication network, another example query might select users based at least in part on the user's location at a boundary where two given cells of a communication network meet, a further example query might select users based at least in part on the user's location at an intersection where three given cells of a communication network meet.

As illustrated, decision 506, "Date/time matched requirement", may relate to screening decisions based on date data and/or time of day data. For example, such a date/time matched requirement may be selected so as to target on peak hour usage, peak day usage, the like, and/or combinations thereof.

As illustrated, decision 510, "User opt-in", may relate to screening decisions based on a user opt-in assent. For example, such a user opt-in requirement may be selected so as to target users who elect to opt-in to measurement. In some examples, fields of a query submission may be compared with real conditions. For example, in cases where privacy is a concern (e.g., where there are legal requirements that mobile users know that QoE information is being collected), an opt-in system may be used. In such an example, users who opt-in for QoE measurement may be sent an QoE activation code. In some examples, incentives may be given to users who opted in QoE measurement.

As illustrated, decision 512, "App. User uses suitable for measurement" may relate to screening decisions based on an application in use being suitable for facial detection via optical sensors associated with the mobile device. For example, such an app. user uses suitable for measurement requirement may be selected so as to target on applications in use that may be suitable for facial detection via optical sensors associated with the mobile device. In such an example, for QoE measurement using optical sensors, applications that involve a user directly facing the optical sensor (e.g., watching video clips, reading from screen, or the like) are suitable. For some applications, such as talking on the mobile, listening to music without facing the screen, video conferencing (though user is facing the camera, but the camera is in use) or when the mobile is not in use, QoE measurement may not as effective. In some examples, only users who are using applications that involved facing the screen may be selected.

Additionally or alternatively, screening for one or more acceptable mobile devices may be based at least in part on a determination that a number of collected samples are less than a number of requested samples. As illustrated, decision 502, "# of samples collected<# of samples requested", may relate to screening decisions based on a determination that a number of collected samples is less than a number of requested samples. In some examples, such a # of samples collected<# of samples requested requirement may be selected so as to target on a number of collected samples basis (e.g., where samples are selected for certain locations, where samples are selected only for a given number queries, where samples are selected randomly, where samples are selected on suitable users, the like, and/or combinations thereof).

Additionally or alternatively, screening for one or more acceptable mobile devices may be based at least in part on a determination that the at least one mobile device matches a requested query. As illustrated, decision 508, "Matched trigger-based conditions", may relate to screening decisions based on a determination that the at least one mobile device matches a requested query. In some examples, such a matched trigger-based conditions requirement may be selected so as to target measurements when QoS is near a QoS threshold. Such an operation may be utilized in real time, automatic, as-needed query submissions.

In operation, process 500 may allow a mobile service provider to formulate a measurement query submission for screening mobile devices to measure QoE selectively. Such selective measurement of QoE may save unnecessary costs and reduce over-measurement.

Figure 3:
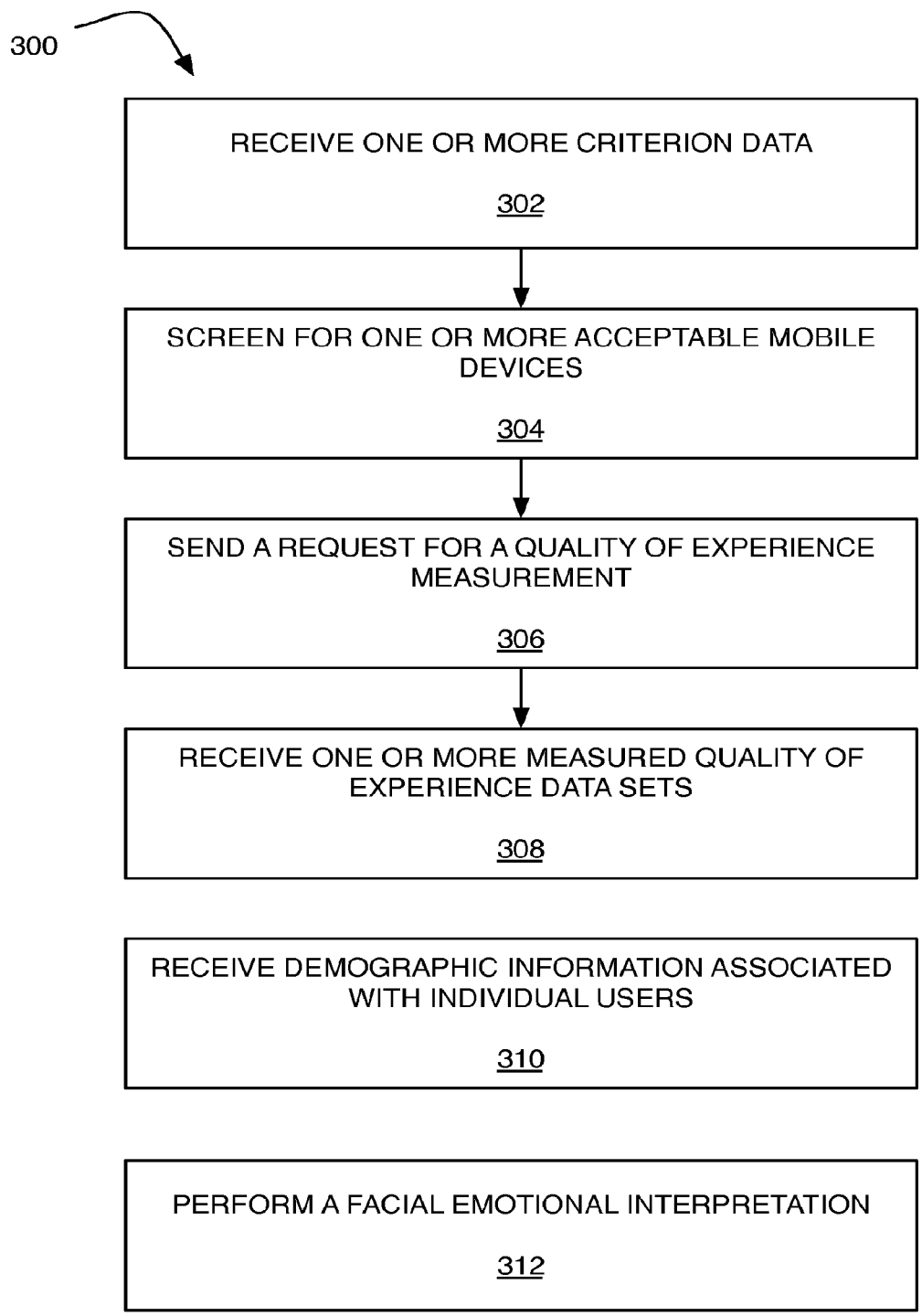
FIG. 3 illustrates another example process for measuring quality of experience that is arranged in accordance with at least some embodiments of the present disclosure.

FIG. 3 illustrates another example process for measuring quality of experience that is arranged in accordance with at least some embodiments of the present disclosure. Process 300 may include one or more of functional operations as indicated by example operations 302, 304, 306, 308, 310, and/or 312.

As illustrated, process 300 may be implemented for measuring quality of experience. Processing may begin at operation 302, "RECEIVE ONE OR MORE CRITERION DATA", where one or more criterion data may be received. For example, one or more criterion data may be received from at least one mobile device. In some examples, the one or more criterion data may include one or more of the following: date data, time of day data, location data, a user opt-in assent, an application in use is suitable for facial detection via one or more optical sensors associated with the at least one mobile device, the like, and/or combinations thereof. As previously described, the one or more of these data sets may be utilized to determine various facial emotional interpretation such as, but not limited to, frustration, sadness, happiness, anger, etc.

Processing may continue from operation 302 to operation 304, "SCREEN FOR ONE OR MORE ACCEPTABLE MOBILE DEVICES", where one or more acceptable mobile devices may be screened. For example, one or more acceptable mobile devices may be screened based at least in part on the one or more criterion data.

Processing may continue from operation 304 to operation 306, "SEND A REQUEST FOR A QUALITY OF EXPERIENCE MEASUREMENT", where a request for a quality of experience measurement may be sent. For example, where a request for a quality of experience measurement may be sent to the one or more acceptable mobile devices. In some examples, the sending of the request for a quality of experience measurement may be based at least in part on a determination that a number of collected samples are less than a number of requested samples. In some examples, the request for a quality of experience measurement may be based at least in part on a determination that the at least one mobile device matches a requested query.

Processing may continue from operation 306 to operation 308, "RECEIVE ONE OR MORE MEASURED QUALITY OF EXPERIENCE DATA SETS", where one or more measured quality of experience data sets may be received. For example, one or more measured quality of experience data sets may be received from at least a portion of the one or more acceptable mobile devices. In some examples, the measured quality of experience data sets may include pupil size data, facial temperature data, the like, and/or combinations thereof.

In some examples, after a successful QoE measurement is completed by a mobile device for a given time period, the mobile device may process captured optical and/or infrared data captured to derive QoE data sets. Additionally, the mobile device may check data robustness of the derived QoE data sets and other data to weed out wrong data. Some possibilities of such cases are when user is making faces or distracted for a long time (e.g., not looking at the camera). QoE measured in such cases may be discarded. In some examples, quality of experience data sets may be automatically deleted from the mobile device after sending the result data to the mobile service provider.

Processing may continue from operation 308 to operation 310, "RECEIVE DEMOGRAPHIC INFORMATION ASSOCIATED WITH INDIVIDUAL USERS", where demographic information associated with individual users of the one or more acceptable mobile devices may be received. For example, demographic information associated with individual users of the one or more acceptable mobile devices may be received, where the demographic information may includes one or more of the following data: age data, gender data, and/or ethnicity data.

In some examples, QoE data sets, demographic data, date data, time of day data, location data, application-in-use data, and/or the like may be sent to a mobile service provider for data compilation and analysis. In some cases, only basic demographic data may be sent instead of detailed user identification and/or phone identification due to privacy considerations. Date data, time of day data, location data, application-in-use data, etc. may be sent too so that a mobile service provider can better interpret the QoE data sets. For example, using the location data, the QoE data sets can be fed into a Geographical Information System; basic demographic data and application-in-use data can further aid in deriving useful insights on QoE; using time data and location data, Quality-of-Service (QoS) data can be extracted and compared against QoE. For example, QoE-vs.-QoS graphs can be used to derive graphs of sensitivities of QoE against QoS; graphs of threshold responses in which QoE drops significantly as QoS changes; graphs of intensity of QoE as QoS changes for various groups; or the like. Such quantification of sensitivity, threshold responses, and/or intensity may allow a mobile service provider to derive insights regarding which application group or user group is to be prioritized so as to maximize overall QoE.

Processing may continue from operation 310 to operation 312, "PERFORM A FACIAL EMOTIONAL INTERPRETATION", where a facial emotional interpretation may be performed. For example, a facial emotional interpretation of the one or more measured quality of experience data sets may be performed based at least in part on the demographic information.

In operation, process 300 (and/or process 600 of FIG. 6) may be utilized for accounting for cultural and/or personal variation in facial emotional interpretations. For example, the mobile device user's profile (e.g., age, gender, ethnicity) may be used to call out a relevant set of facial interpretation rules or database for a user's facial data to compare against. In some examples, classification techniques accounting for cultural and/or personal variation in facial emotional interpretations may include template-based classification in static images; template-based classification in image sequences; fuzzy rule-based classification in static images; fuzzy rule-based classification in image sequences; artificial-neural-network (ANN)-based classification; hidden-Markov-model (HMM)-based classification; Bayesian classification; the like; and/or combinations thereof.

Figure 4:
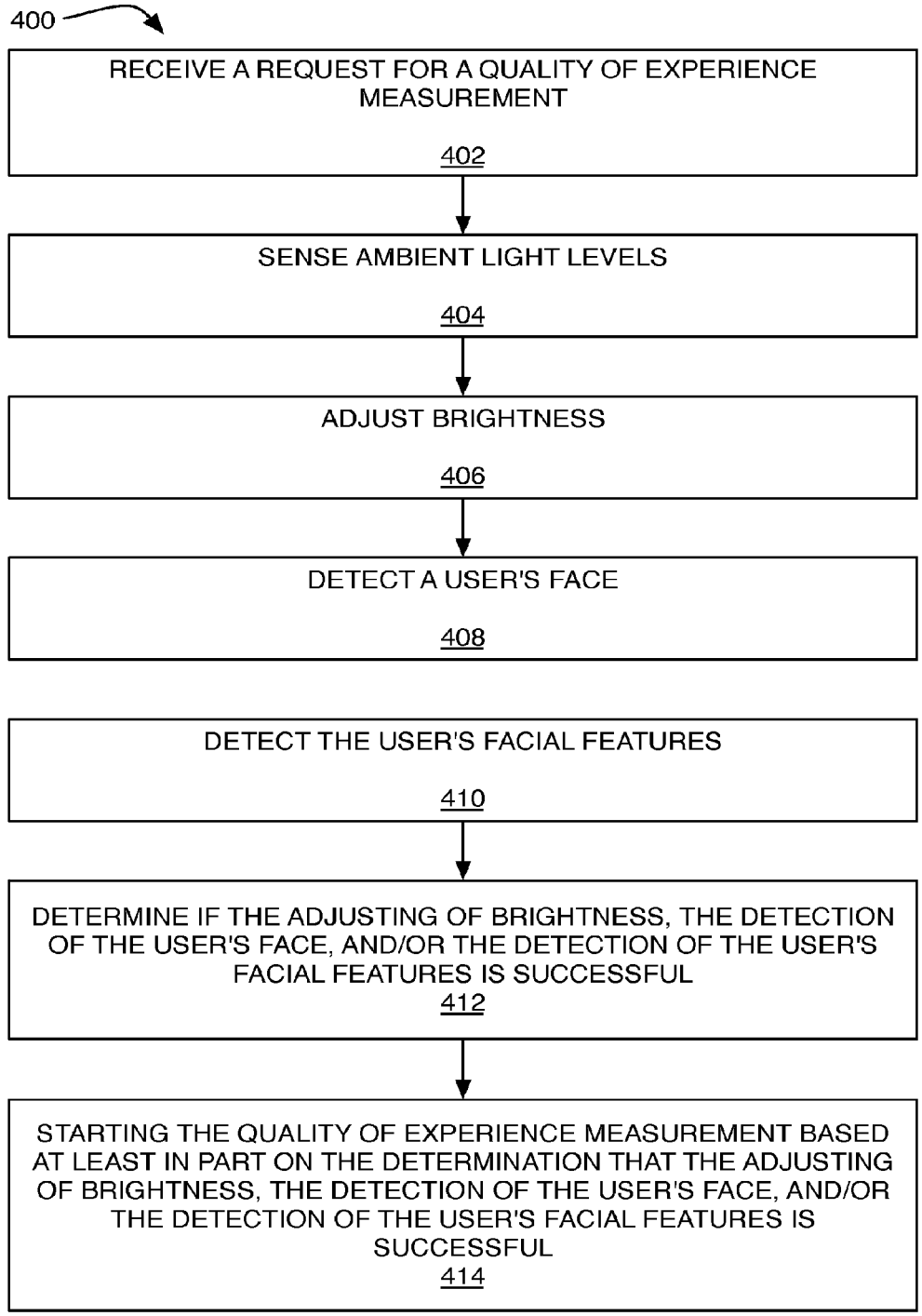
FIG. 4 illustrates a further example process for measuring quality of experience that is arranged in accordance with at least some embodiments of the present disclosure.

FIG. 4 illustrates a further example process for measuring quality of experience that is arranged in accordance with at least some embodiments of the present disclosure. Process 400 may include one or more of functional operations as indicated by example operations 402, 404, 406, 408, 410, 412, and/or 414.

As illustrated, process 400 may be implemented for measuring quality of experience. Processing may begin at operation 402, "RECEIVE A REQUEST FOR A QUALITY OF EXPERIENCE MEASUREMENT", where a request for a quality of experience measurement may be received. For example, a request for a quality of experience measurement may be received via a mobile device from a mobile service provider.

Processing may continue from operation 402 to operation 404, "SENSE AMBIENT LIGHT LEVELS", where ambient light levels may be sensed. For example, ambient light levels may be sensed via one or more optical sensors associated with the mobile device.

Processing may continue from operation 404 to operation 406, "ADJUST BRIGHTNESS", where brightness may be adjusted. For example, brightness may be adjusted based at least in part on the sensed ambient light levels. For example, some smart-phones may be capable of adjusting screen brightness through use of ambient sensors. The same or similar mechanism may be used to adjust the gain of optical data to be measured by an optical sensor. Note that the capturing of QoE data and subsequent data analysis may be unknown to a user. For example, the mobile device's screen and application used may not be disturbed by QoE measurement.

Processing may continue from operation 406 to operation 408, "DETECT A USER'S FACE", where a user's face may be detected. For example, a user's face may be detected via the one or more optical sensors associated with the mobile device. For example, after optimal brightness is achieved, optical data captured through a user-facing optical sensor may be analyzed to detect a face. In some examples, such facial detection may be done by capturing infrared data and pattern recognition. By capturing and analyzing temperature emitted by a face, a coarse area of face may be detected. A finer definition of face may be achieved through pattern recognition.

Processing may continue from operation 408 to operation 410, "DETECT THE USER'S FACIAL FEATURES", where the user's facial features may be detected. For example, the user's facial features may be detected via the one or more optical sensors associated with the mobile device. For example, once the area of a face is established, process 400 may identify face features (for examples eyes, eyebrows, lips/mouth, nose, face "wrinkles", the like, and/or combinations thereof) through relative positions. In some examples, facial recognition may be accomplished via holistic spatial analysis-type facial feature detection, explicit measurement of features-type facial feature detection (e.g., such as wrinkles), estimation of motion flow fields-type facial feature detection, the like, and/or combinations thereof. In some examples, face feature extraction may be done through 2D or 3D procedures. For example, a mobile phone with a camera can capture facial data in 2D manner. With advent of 3D-capable cameras, for example, multiple optical sensors may be used to achieve 3D data capture.

Additionally or alternatively, adjusting a magnification level may be performed. For example, a magnification level associated with the one or more optical sensors may be adjusted based at least in part on the detection of the user's face. In some examples, such an adjustment of a magnification level associated with the one or more optical sensors may be performed prior to the detection of the user's facial features. For example, once the outline of a face is detected, the focus and/or magnification of an optical sensor of a mobile device may be adjusted automatically such that the face is optimally fitted to considerable large size captured by the optical sensor.

Additionally or alternatively, foreign object detection may be performed to improve or modify proper facial feature recognition. For example, determination may be made as to whether a threshold level of facial features is available for QoE measurement. For example, foreign objects (for examples beard, moustache, large spectacles) may obstruct proper facial feature recognition. However, it may be possible to exclude certain face features as long as a preset number of features are available. In one example, let say a total of thirty sets of features can be extracted from a face, if twenty sets of features would provide meaningful emotion recognition, the measurement may still proceed as long as less than ten sets of features are covered and not measurable.

Processing may continue from operation 410 to operation 412, "DETERMINE IF THE ADJUSTING OF BRIGHTNESS, THE DETECTION OF THE USER'S FACE, AND/OR THE DETECTION OF THE USER'S FACIAL FEATURES IS SUCCESSFUL", where a determination may be made as to whether the adjusting of brightness, the detection of the user's face, and/or the detection of the user's facial features is successful.

Additionally or alternatively, process 400 may include operations to repeat the adjusting of brightness, the detection of the user's face, and/or the detection of the user's facial features based at least in part on a determination that the adjusting of brightness, the detection of the user's face, and/or the detection of the user's facial features is unsuccessful. In some examples, the repeating may associated with one or more threshold values. In such examples, a determination may be made as to whether any of the one or more threshold values have been exceeded. For example, such threshold values may be implemented as individual count limits associated the number of trials for adjusting of brightness, the number of trials for the detection of the user's face, and/or the number of trials for the number of trials for the detection of the user's facial features. For example, there may be a light counter, a face counter, a feature counter, and so on. These counters may be reset to zero again if lightness, face detection, face feature detection are optimized. In some examples, a failure to measure quality of experience message may be sent to the mobile service provider based at least in part a determination that the one or more threshold values have been exceeded.

Processing may continue from operation 412 to operation 414, "STARTING THE QUALITY OF EXPERIENCE MEASUREMENT BASED AT LEAST IN PART ON THE DETERMINATION THAT THE ADJUSTING OF BRIGHTNESS, THE DETECTION OF THE USER'S FACE, AND/OR THE DETECTION OF THE USER'S FACIAL FEATURES IS SUCCESSFUL", where the quality of experience measurement may be started. For example, the quality of experience measurement may be started based at least in part on the determination that the adjusting of brightness, the detection of the user's face, and/or the detection of the user's facial features is successful.

Additionally or alternatively, result data associated with the quality of experience measurement may be sent to the mobile service provider from the mobile device. For example, such result data associated with the quality of experience measurement may include pupil size data, facial temperature data, the like, and/or combinations thereof. In such an example, infrared sensor-type optical sensors may be utilized to measure facial temperature and while sensitive optical sensors may be utilized to measure pupil size. Facial temperature and pupil size may be used as physiology "windows" for emotions. For example, the emotion groups of amusement, anger, contempt, contentment, disgust, embarrassment, excitement, fear, guilt, pride in achievement, relief, sadness/distress, satisfaction, sensory pleasure, shame, and/or the like may be measured. For measurement of QoE, only emotion groups relevant to QoE may be measured while emotion groups not relevant to QoE need not be measured. In some examples, machine-learning (and testing) of emotion recognition can be done on Ekman-Hager facial action exemplars or Cohn-Kanade AU-coded face expression image database. Once machine-learning and testing are providing satisfactory results, the algorithm or program may be stored into mobile devices of mobile users who opted-in for QoE measurement. The algorithm or program may then be updated automatically if improved versions become available. In some examples, the result data may be automatically deleted from the mobile device after sending the result data to the mobile service provider.

Additionally or alternatively, when mobile device initialization and preparation for measurement are done successfully, process 400 may include operations to activate a timer to time real QoE measurement. The duration to measure QoE may be at a mobile service provider's discretion. The considerations for the duration are such that it is not too short that rendered QoE measured useless and it is not too long that caused over-measurement and wasted resources.

Additionally or alternatively, process 400 may include operations to dynamically adjust brightness based at least in part on the sensed ambient light levels during the quality of experience measurement. For example, real time dynamic adjustment to brightness may be utilized since a mobile device user may in fact be mobile, such that user may move to places with different lighting condition or move his/her position when QoE is being measured.

Additionally or alternatively, process 400 may include operations to dynamically adjust a magnification level associated with the one or more optical sensors based at least in part on the detection of the user's face during the quality of experience measurement. In cases where face detection loss has occurred, process 400 may de-magnify first, detect the face again and then magnify back. For cases when dynamic adjustment failed to function after limited number of trials, the QoE measurement may be abandoned. A message may be sent to a mobile service provider to notify about the failure of measurement. A mobile service provider may then identify another suitable mobile user for QoE measurement. In such an example, the timer counter of QoE measurement may be terminated too.

In operation, before the end of a QoE measurement, it is possible that events happen that may interrupt the QoE measurement. Some of the possible events are: light conditions unsuitable (e.g., where the mobile user moves to dark places), the user switches to use application that prevents QoE measurement (e.g., talking over the phone or listening to music without facing the optical sensor), and/or the user moves away from the mobile device such that there is no data captured by the optical sensor. In such cases, after a fixed amount of trials and failures, the QoE measurement may stop and the timer counter of QoE measurement may be terminated too.

FIG. 6 illustrates an example computer program product 600 that is arranged in accordance with at least some examples of the present disclosure. Program product 600 may include a signal bearing medium 602. Signal bearing medium 602 may include one or more machine-readable instructions 604, which, if executed by one or more processors, may operatively enable a computing device to provide the functionality described above with respect to FIG. 2, FIG. 3, FIG. 4, and/or FIG. 5. Thus, for example, referring to the system of FIG. 1 one or more mobile devices 100 and/or mobile service providers 120 may undertake one or more of the actions shown in FIG. 2, FIG. 3, FIG. 4, and/or FIG. 5 in response to instructions 604 conveyed by medium 602.

In some implementations, signal bearing medium 602 may encompass a non-transitory computer-readable medium 606, such as, but not limited to, a hard disk drive, a Compact Disc (CD), a Digital Versatile Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass communications medium 610, such as, but not limited to, a digital and/or an analog communication medium (e.g., a fiber optic cable, a waveguide, a wired communications link, a wireless communication link, etc.).

Figure 7:
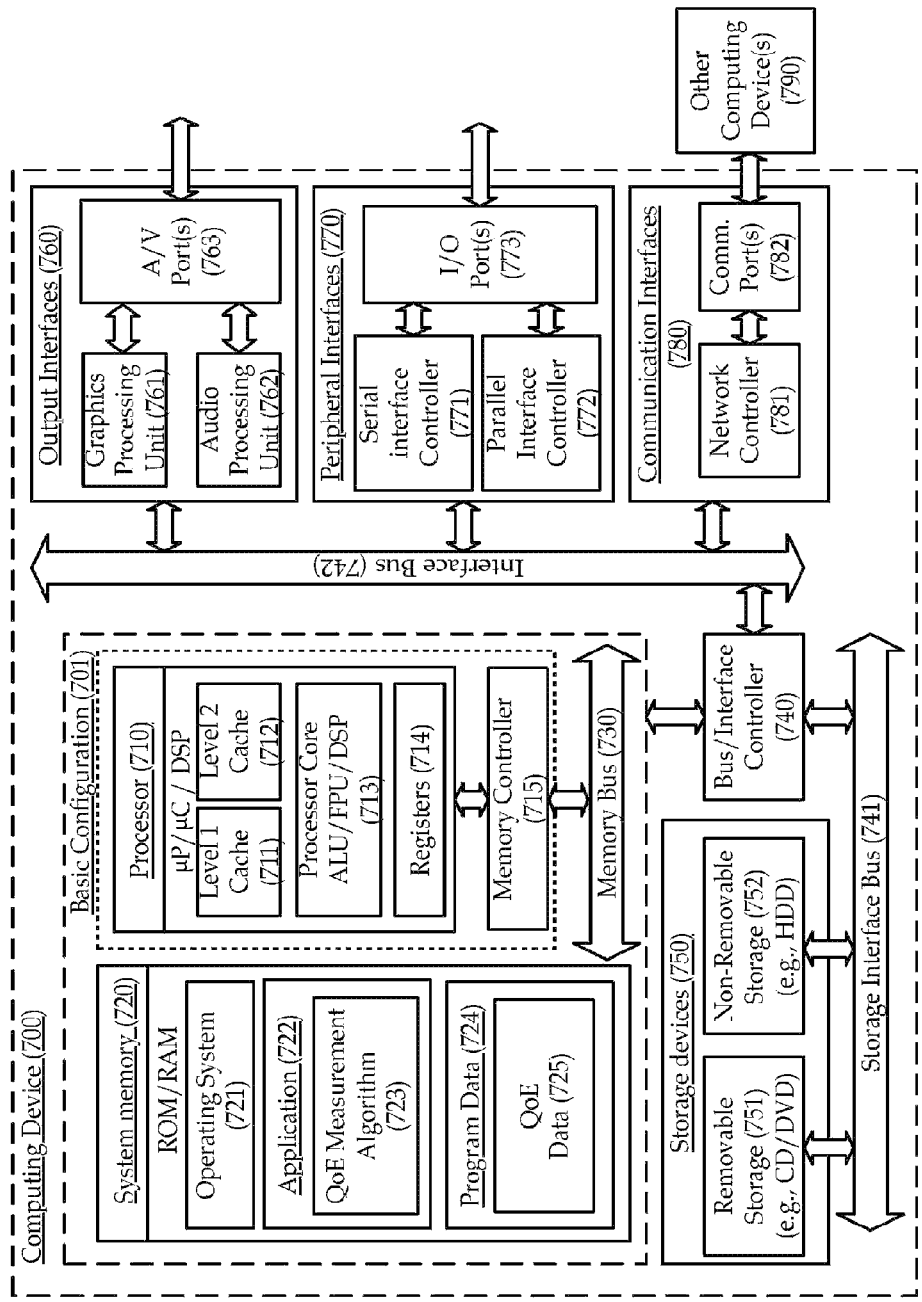
FIG. 7 is a block diagram of an illustrative embodiment of a computing device arranged in accordance with at least some embodiments of the present disclosure.

FIG. 7 is a block diagram illustrating an example computing device 700, such as might be embodied by a person skilled in the art, that is arranged in accordance with at least some embodiments of the present disclosure. In one example configuration 701, computing device 700 may include one or more processors 710 and system memory 720. A memory bus 730 may be used for communicating between the processor 710 and the system memory 720.

Depending on the desired configuration, processor 710 may be of any type including but not limited to a microprocessor (.mu.P), a microcontroller (.mu.C), a digital signal processor (DSP), or any combination thereof. Processor 710 may include one or more levels of caching, such as a level one cache 711 and a level two cache 712, a processor core 713, and registers 714. The processor core 713 may include an arithmetic logic unit (ALU), a floating point unit (FPU), a digital signal processing core (DSP Core), or any combination thereof. A memory controller 715 may also be used with the processor 710, or in some implementations the memory controller 715 may be an internal part of the processor 710.

Depending on the desired configuration, the system memory 720 may be of any type including but not limited to volatile memory (such as RAM), non-volatile memory (such as ROM, flash memory, etc.) or any combination thereof. System memory 720 may include an operating system 721, one or more applications 722, and program data 724. Application 722 may include a QoE measurement algorithm 723 in a mobile device and/or a mobile service provider that is arranged to perform the functions as described herein including the functional blocks and/or actions described with respect to process 200 of FIG. 2, process 300 of FIG. 3, process 400 of FIG. 4, and/or process 500 of FIG. 5. Program Data 724 may include QoE data 725 for use with QoE measurement algorithm 723. In some example embodiments, application 722 may be arranged to operate with program data 724 on an operating system 721 such that implementations of measuring QoE may be provided as described herein. For example, one or more mobile devices 100 and/or mobile service providers 120 (See, e.g., FIG. 1) may comprise all or a portion of computing device 700 and be capable of performing all or a portion of application 722 such that implementations of measuring QoE may be provided as described herein. This described basic configuration is illustrated in FIG. 7 by those components within dashed line 701.

Computing device 700 may have additional features or functionality, and additional interfaces to facilitate communications between the basic configuration 701 and any required devices and interfaces. For example, a bus/interface controller 740 may be used to facilitate communications between the basic configuration 701 and one or more data storage devices 750 via a storage interface bus 741. The data storage devices 750 may be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of device 700.

Computing device 700 may also include an interface bus 742 for facilitating communication from various interface devices (e.g., output interfaces, peripheral interfaces, and communication interfaces) to the basic configuration 701 via the bus/interface controller 740. Example output interfaces 760 may include a graphics processing unit 761 and an audio processing unit 762, which may be configured to communicate to various external devices such as a display or speakers via one or more A/V ports 763. Example peripheral interfaces 770 may include a serial interface controller 771 or a parallel interface controller 772, which may be configured to communicate with external devices such as input devices (e.g., keyboard, mouse, pen, voice input device, touch input device, etc.) or other peripheral devices (e.g., printer, scanner, etc.) via one or more I/O ports 773. An example communication interface 780 includes a network controller 781, which may be arranged to facilitate communications with one or more other computing devices 790 over a network communication via one or more communication ports 782. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 700 may also be implemented as a personal computer including both laptop computer and non-laptop computer configurations. In addition, computing device 700 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

The invention claimed is:

1. A method, comprising:
    receiving, via a mobile device, a request for a quality of experience measurement from a mobile service provider;
    sensing ambient light levels via one or more optical sensors associated with the mobile device;
    adjusting brightness based at least in part on the sensed ambient light levels;
    detecting a user's face via the one or more optical sensors associated with the mobile device;
    detecting the user's facial features via the one or more optical sensors associated with the mobile device;

determining if the adjusting of brightness, the detection of the user's face, and/or the detection of the user's facial features is successful; and starting the quality of experience measurement based at least in part on the determination that the adjusting of brightness, the detection of the user's face, and/or the detection of the user's facial features is successful.

2. The method of claim 1, further comprising adjusting a magnification level associated with the one or more optical sensors based at least in part on the detection of the user's face prior to the detection of the user's facial features.

3. The method of claim 1, further comprising sending, via the mobile device, result data associated with the quality of experience measurement to the mobile service provider.

4. The method of claim 1, further comprising sending, via the mobile device, result data associated with the quality of experience measurement to the mobile service provider, and automatically deleting the result data from the mobile device after sending the result data to the mobile service provider.

5. The method of claim 1, further comprising sending, via the mobile device, result data associated with the quality of experience measurement to the mobile service provider, wherein the result data includes pupil size data and/or facial temperature data.

6. The method of claim 1, further comprising sending via the mobile device, result data associated with the quality of experience measurement to the mobile service provider, wherein the result data includes facial emotional interpretation.

7. The method of claim 1, further comprising:
repeating the adjusting of brightness, the detection of the user's face, and/or the detection of the user's facial features is successful based at least in part on a determination that the adjusting of brightness, the detection of the user's face, and/or the detection of the user's facial features is unsuccessful, wherein the repeating is associated with one or more threshold values;

determining if any of the one or more threshold values have been exceeded; and sending a failure to measure quality of experience message to the mobile service provider based at least in part a determination that the one or more threshold values have been exceeded.

8. The method of claim 1, further comprising dynamically adjusting brightness based at least in part on the sensed ambient light levels during the quality of experience measurement.

9. The method of claim 1, further comprising dynamically adjusting a magnification level associated with the one or more optical sensors based at least in part on the detection of the user's face during the quality of experience measurement.

10. The method of claim 1, further comprising:
adjusting a magnification level associated with the one or more optical sensors based at least in part on the detection of the user's face prior to the detection of the user's facial features;

repeating the adjusting of brightness, the detection of the user's face, and/or the detection of the user's facial features is successful based at least in part on a determination that the adjusting of brightness, the detection of the user's face, and/or the detection of the user's facial features is unsuccessful, wherein the repeating is associated with one or more threshold values;

determining if any of the one or more threshold values have been exceeded;

sending a failure to measure quality of experience message to the mobile service provider based at least in part a determination that the one or more threshold values have been exceeded;

sending, via the mobile device, result data associated with the quality of experience measurement to the mobile service provider, wherein result data includes pupil size data and/or facial temperature data;

automatically deleting the result data from the mobile device after sending the result data to the mobile service provider;

dynamically adjusting brightness based at least in part on the sensed ambient light levels during the quality of experience measurement; and dynamically adjusting a magnification level associated with the one or more optical sensors based at least in part on the detection of the user's face during the quality of experience measurement.

11. A mobile device apparatus, comprising:
a processor;
one or more optical sensors coupled to the processor;
an RF transceiver operably coupled to the processor; and
an antenna operably coupled to the RF transceiver,
wherein the processor, in conjunction with the one or more optical sensors, the RF transceiver, and the antenna, is configured to:
receive, via the RF transceiver and the antenna, a request for a quality of experience measurement from a mobile service provider;

sense ambient light levels via the one or more optical sensors;

adjust brightness based at least in part on the sensed ambient light levels;

detect a user's face via the one or more optical sensors associated with the mobile device;

detect the user's facial features via the one or more optical sensors associated with the mobile device;

determine if the adjusting of brightness, the detection of the user's face, and/or the detection of the user's facial features is successful; and start the quality of experience measurement based at least in part on the determination that the adjusting of brightness, the detection of the user's face, and/or the detection of the user's facial features is successful.

12. The apparatus of claim 11, wherein the processor is further configured to:
adjust a magnification level associated with the one or more optical sensors based at least in part on the detection of the user's face prior to the detection of the user's facial features;

repeat the adjusting of brightness, the detection of the user's face, and/or the detection of the user's facial features based at least in part on a determination that the adjusting of brightness, the detection of the user's face, and/or the detection of the user's facial features is unsuccessful, wherein the repeating is associated with one or more threshold values;

determine if any of the one or more threshold values have been exceeded;

send, via the RF transceiver and the antenna, a failure to measure quality of experience message to the mobile service provider based at least in part a determination that the one or more threshold values have been exceeded;

send, via the RF transceiver and the antenna, result data associated with the quality of experience measurement to the mobile service provider, wherein the result data includes pupil size data and/or facial temperature data;

automatically delete the result data from the mobile device after sending the result data to the mobile service provider;

dynamically adjust brightness based at least in part on the sensed ambient light levels during the quality of experience measurement; and dynamically adjust a magnification level associated with the one or more optical sensors based at least in part on the detection of the user's face during the quality of experience measurement.

\* \* \* \* \*